(12) United States Patent
Shirani-Mehr et al.

(10) Patent No.: US 9,225,404 B2
(45) Date of Patent: Dec. 29, 2015

(54) HYBRID BEAMFORMING FOR DATA TRANSMISSION

(71) Applicants: Hooman Shirani-Mehr, Portland, OR (US); Masoud Sajadieh, Fremont, CA (US)

(72) Inventors: Hooman Shirani-Mehr, Portland, OR (US); Masoud Sajadieh, Fremont, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/125,258

(22) PCT Filed: Jun. 26, 2013

(86) PCT No.: PCT/US2013/048008
§ 371 (c)(1),
(2) Date: Dec. 10, 2013

(87) PCT Pub. No.: WO2014/158206
PCT Pub. Date: Oct. 2, 2014

(65) Prior Publication Data
US 2015/0139292 A1  May 21, 2015

Related U.S. Application Data

(60) Provisional application No. 61/806,821, filed on Mar. 29, 2013.

(51) Int. Cl.
*H04B 7/02* (2006.01)
*H04B 7/04* (2006.01)
(Continued)

(52) U.S. Cl.
CPC ............... *H04B 7/0456* (2013.01); *H04B 1/56* (2013.01); *H04B 7/0417* (2013.01); *H04L 5/0048* (2013.01); *H04L 5/0051* (2013.01);
(Continued)

(58) Field of Classification Search
CPC .. H04B 7/0639; H04B 7/0417; H04B 7/0626; H04B 7/0486; H04B 7/0632; H04B 7/024; H04B 7/0617; H04B 7/0452; H04B 7/0695; H04B 7/088; H04L 1/0026; H04L 2025/03426; H04L 5/0073; H04W 72/0413
USPC .......................................................... 375/267
See application file for complete search history.

(56) References Cited

U.S. PATENT DOCUMENTS

2006/0268769 A1  11/2006 Pan et al.
2010/0238824 A1*  9/2010 Farajidana et al. ........... 370/252
(Continued)

OTHER PUBLICATIONS

International Search Report and Written Opinion received for PCT Patent Application No. PCT/US2013/048008, mailed on Dec. 27, 2013, 13 Pages.
Hitachi, Ltd., "Enhanced CSI feedback solutions for DL MIMO enhancement", R1-130339, 3GPP TSG RAN WGI Meeting #72, St. Julian' s, Malta, Jan. 28-Feb. 1, 2013, 2 Pages.
(Continued)

*Primary Examiner* — Don N Vo
(74) *Attorney, Agent, or Firm* — Thorpe North & Western

(57) ABSTRACT

Technology to provide hybrid beamforming feedback is disclosed. In an example, a user equipment (UE) can include computer circuitry configured to: Receive a reference signal (RS) from a node; calculate an optimal channel direction from the RS; calculate an optimal signal-to-interference-plus-noise ratio (SINR) for the optimal channel direction, where the optimal SINR is conditionally calculated with an intra-cell interference component or calculated without the intra-cell interference component based on a feedback configuration; and transmit the optimal channel direction and the optimal SINR to the node.

23 Claims, 13 Drawing Sheets

(51) Int. Cl.

| | |
|---|---|
| H04L 5/00 | (2006.01) |
| H04B 1/56 | (2006.01) |
| H04W 56/00 | (2009.01) |
| H04W 76/02 | (2009.01) |
| H04W 36/30 | (2009.01) |
| H04W 24/00 | (2009.01) |
| H04W 36/26 | (2009.01) |
| H04W 48/18 | (2009.01) |
| H04W 24/10 | (2009.01) |
| H04W 36/00 | (2009.01) |
| H04W 36/22 | (2009.01) |
| H04W 48/16 | (2009.01) |
| H04W 36/08 | (2009.01) |
| H04W 48/12 | (2009.01) |
| H04W 88/08 | (2009.01) |

(52) U.S. Cl.
CPC ............ *H04L5/0057* (2013.01); *H04L 5/0073* (2013.01); *H04L 5/0085* (2013.01); *H04W 24/00* (2013.01); *H04W 24/10* (2013.01); *H04W 36/0005* (2013.01); *H04W 36/22* (2013.01); *H04W 36/26* (2013.01); *H04W 36/30* (2013.01); *H04W 48/18* (2013.01); *H04W 56/001* (2013.01); *H04W 76/023* (2013.01); *H04L 5/0007* (2013.01); *H04W 36/08* (2013.01); *H04W 48/12* (2013.01); *H04W 48/16* (2013.01); *H04W 88/08* (2013.01); *Y02B 60/50* (2013.01)

(56) References Cited

U.S. PATENT DOCUMENTS

| | | | |
|---|---|---|---|
| 2012/0188976 A1* | 7/2012 | Kim et al. | 370/329 |
| 2013/0064276 A1* | 3/2013 | Kim et al. | 375/219 |
| 2014/0198751 A1* | 7/2014 | Prasad et al. | 370/329 |

OTHER PUBLICATIONS

Mediatek, Inc., "CSI Feedback Enhancement Considerations for Rel-12", R1-130214, 3GPP TSG RAN WG1 Meeting #72, St. Julian's, Malta, Jan. 28-Feb. 1, 2013, 2 Pages.

Samsung, "Proposals for CSI Feedback Enhancement", R1-130287, 3GPP TSG RAN WG1 #72, St. Julian's, Malta, Jan. 28-Feb. 1, 2013, 4 Pages.

Zte, "Discussion on various CSI feedback enhancement schemes", R1-130142, 3GPP TSG RAN WG1 Meeting #72, St. Julian's, Malta, Jan. 28-Feb. 1, 2013, 2 Pages.

Rusek, et al., "Scaling Up MIMO: Opportunities and Challenges with Very Large Arrays", IEEE Signal Processing Magazine, Journal Club, Mar. 21, 2013, pp. 1-9.

Sharif, et al., "On the capacity of MIMO Broadcast Channels With Partial Side Information", IEEE Transactions on Information Theory, vol. 51, No. 2, Feb. 2005, pp. 506-522.

Dimic, et al., "On Downlink Beamforming With Greedy User Selection: Performance Analysis and a Simple New Algorithm", IEEE Transactions on Signal Processing, vol. 53, No. 10, Oct. 2005, pp. 3857-3868.

Yoo, et al., "On the Optimality of Multiantenna Broadcast Scheduling Using Zero-Forcing Beamforming", IEEE Journal on Selected Areas in Communications, vol. 24, No. 3, Mar. 2006, pp. 528-541.

Samsung, "Downlink MIMO for EUTRA", 3GPP TSG RAN WG1 Meeting # 44, R1-060335, Feb. 13-17, 2006, pp. 1-10.

3GPP TS 36.211, V9.1.0, "3rd Generation Partnership Project, Technical Specification Group Radio Access Network", Evolved Universal Terrestrial Radio Access (E-UTRA); Physical Channels and Modulation, Release 9, Mar. 2010, pp. 1-85.

3GPP TS 36.212, V8.1.0, "3rd Generation Partnership Project, Technical Specification Group Radio Access Network", Evolved Universal Terrestrial Radio Access (E-UTRA), Multiplexing and channel coding, Release 8, Nov. 2007, pp. 1-39.

3GPP TS 36.213, V8.2.0, "3rd Generation Partnership Project, Technical Specification Group Radio Access Network", Evolved Universal Terrestrial Radio Access (E-UTRA), Physical Layer Procedures, Release 8, Mar. 2008, pp. 1-30.

* cited by examiner

SISO

SIMO

MISO

MIMO

HYBRID BEAMFORMING FOR DATA TRANSMISSION

RELATED APPLICATIONS

This application claims the benefit of and hereby incorporates by reference U.S. Provisional Patent Application Ser. No. 61/806,821, filed Mar. 29, 2013.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission (also known as a broadcast channel (BC)) can be a communication from the node (e.g., eNodeB) to the wireless device (e.g., UE), and the uplink (UL) transmission (also known as a multiple access channel (MAC)) can be a communication from the wireless device to the node.

The eNB can have multiple antennas used for transmission to the UEs, allowing the eNB to use multiple-input and multiple-output (MIMO). MIMO is a smart antenna technology that refers to the use of multiple antennas at both the transmitter and receiver to improve communication performance, where input and output refer to a radio channel carrying the signal, not necessarily to the devices having antennas. In MIMO, up to eight transmit or receive antennas can be used, or up to eight channels can be used for transmission of a resource.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
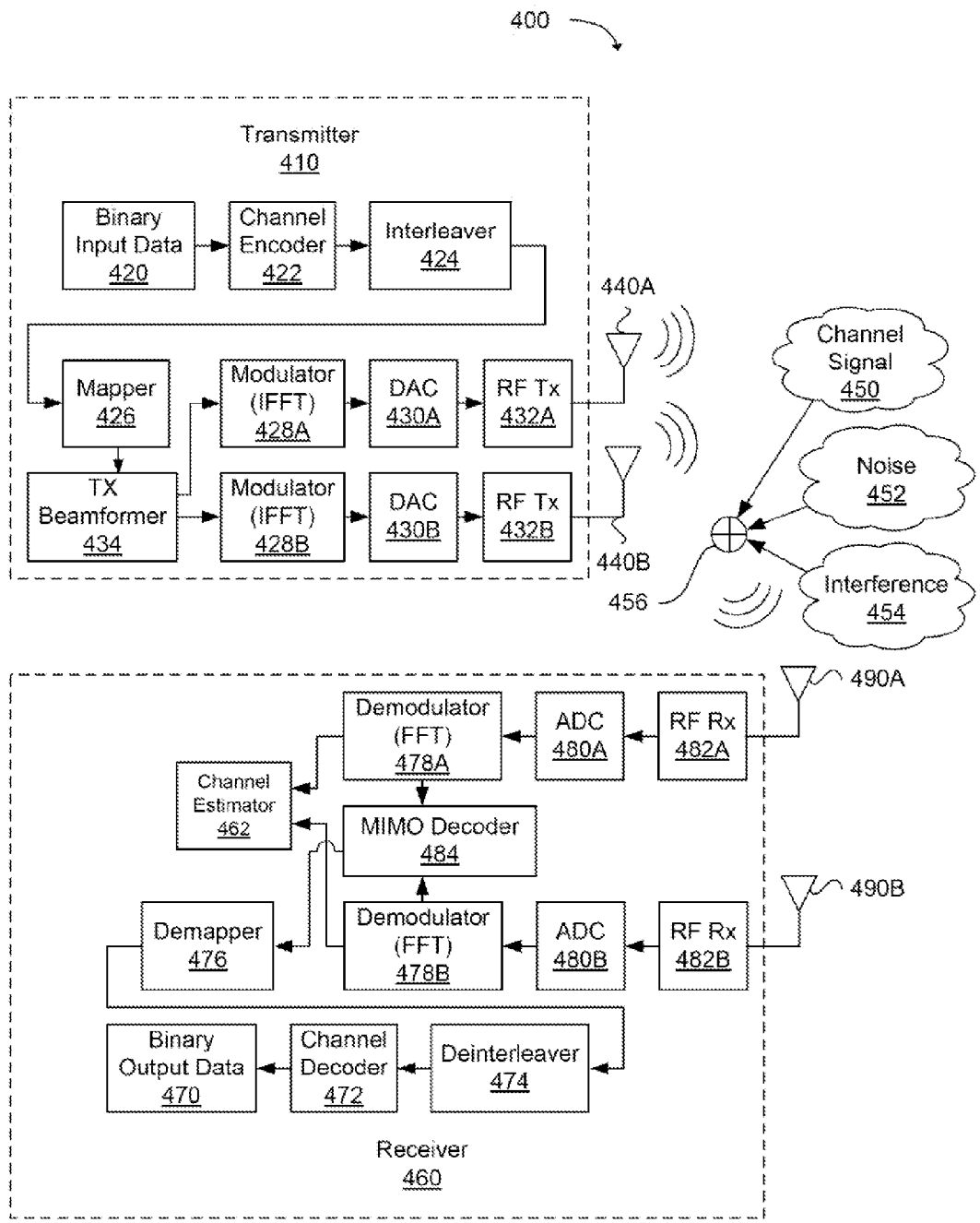
FIG. 1 illustrates a block diagram of the physical layer of a transmitter and receiver in an orthogonal frequency-division multiplexing (OFDM) wireless network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system 400, as illustrated in FIG. 1. A basic multiple-input multiple-output (MIMO) system is used for simplicity in illustrating the basic hardware transmission components, but the components can also be adapted for a complex MIMO system, a single-input and single-output (SISO) system, or similar system. For example in a MIMO system, at the transmitter 410, binary input data 420 can be protected through encoding using a channel encoder 422, interleaved against fading phenomenon using an interleaver 424, and mapped to improve reliability using a mapper 426. The mapped data can be separated into layers for antenna ports by a transmitter (TX) beamformer 434 and the layers can be OFDM modulated into OFDM symbols using modulators 428A-B. The modulators can use an inverse fast Fourier transform (IFFT) algorithm to compute the inverse discrete Fourier transform (IDFT) to generate modulated signals (vector x for each antenna port). The modulated signals can be converted to analog signals with digital-to-analog converters (DACs) 430A-B. The analog signals can be transmitted via radio frequency (RF) transmitters (Txs) 432A-B configured to send the signal to transmitter antennas 440A-B operable to communicate the signal. The analog signals will follow a path referred to as a channel. The analog signals travelling through that path can be referred to as a channel signal 450. The physical layer can include other components (not shown), such as series-to-parallel (S/P) converters, parallel-to-serial (P/S) converters, cyclic prefix (CP) inserters and deleters, guardband inserters and deleters, and other desired components.

The transmitted channel signal 450 can be subject to noise 452 and interference 454. The interference can include intra-cell interference and intercell interference. Intra-cell interference can refer to interference from other channel signals transmitted within the cell of the transmitter 410. Intercell interference can refer to interference from other channel signals transmitted by neighboring cells. The noise and interference is represented as an addition 456 to the channel signal, which can be received by receiver antennas 490A-B and one or more radio frequency (RF) receivers (Rxs) 482A-B at the receiver 460. The channel signal combined with the noise and interference can be converted to a digital modulated signal with analog-to-digital converters (ADCs) 480A-B. The digital signal can be OFDM demodulated using demodulators 478A-B. The demodulators can use a fast Fourier transform (FFT) algorithm to compute the discrete Fourier transform (DFT) to generate demodulated signals (vector y for each antenna port). A channel estimator 462 can use the demodulated signal to estimate the channel 450 and the noise and interference that occurs in the channel. The channel estimator can include a feedback generator or be in communication with the feedback generator, which can generate a physical uplink shared channel (PUSCH) feedback report, such as a channel quality indicator (CQI) report, a precoding matrix indicator (PMI) report, or a transmission rank indicator (RI) report. The CQI can be used to assist the MIMO transmissions modes. The demodulated signals can be combined using a MIMO decoder 484, demapped using a demapper 476, deinterleaved using a deinterleaver 474, and decoded by a channel decoder 472 to generate binary output data 470 that can be used by other layers of the receiving station.

Figure 2:
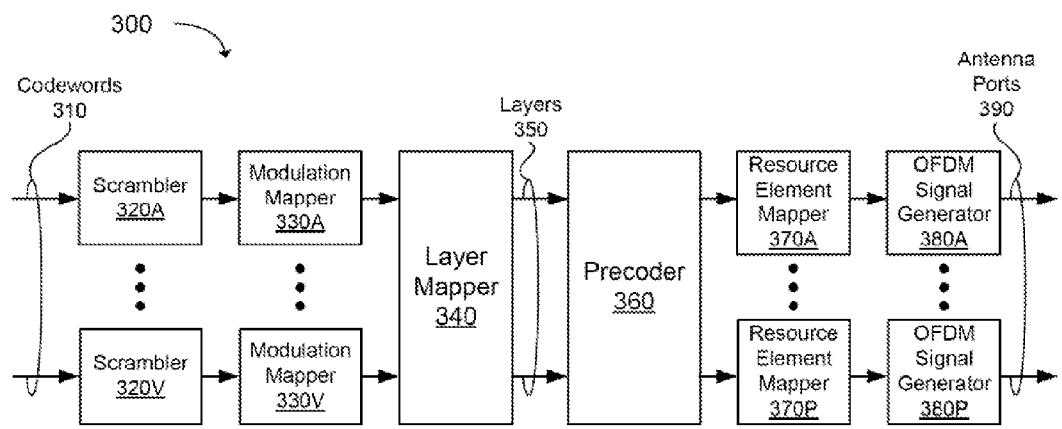
FIG. 2 illustrates a block diagram of physical channel processing of a physical channel processor in accordance with an example.

FIG. 2 illustrates additional details related to the interleaver 424, the mapper 426, the transmitter beamformer 434, and the modulators 428A-B of the physical channel processor shown in FIG. 1 for an LTE MIMO mobile communication system. Corresponding features can also exist on the receiver 460. The MIMO physical channel processor 300 of FIG. 2 can include scramblers 320A-V, modulation mappers 330A-V, a layer mapper 340, a precoder 360, resource element mappers 370A-P, and OFDM signal generators 380A-P. The scramblers can scramble each of the codewords 310 into coded bits to be transmitted on a physical channel. Modulation mappers can modulate scrambled bits to generate complex-valued modulation symbols. A layer mapper can map the modulation symbols onto a plurality of transmission layers 350. The precoder can precode the modulation symbols on each layer for transmission on antenna ports 590. The procoder can use a codebook known both at the transmitter (e.g., eNB) and the receiver (e.g., UE) or be calculated at the transmitter and transferred to or learned at the receiver. The codebook can define a set of vectors and matrices at both the transmitter and the receiver, which can achieve a high precoding gain, lower feedback overhead, and provide flexibility to support various antenna configurations and different numbers of data streams. The resource element mappers can map the modulation symbols for each antenna port to resource elements (REs). The OFDM signal generator can generate a complex-valued time-domain OFDM signal for each antenna port.

Figure 3:
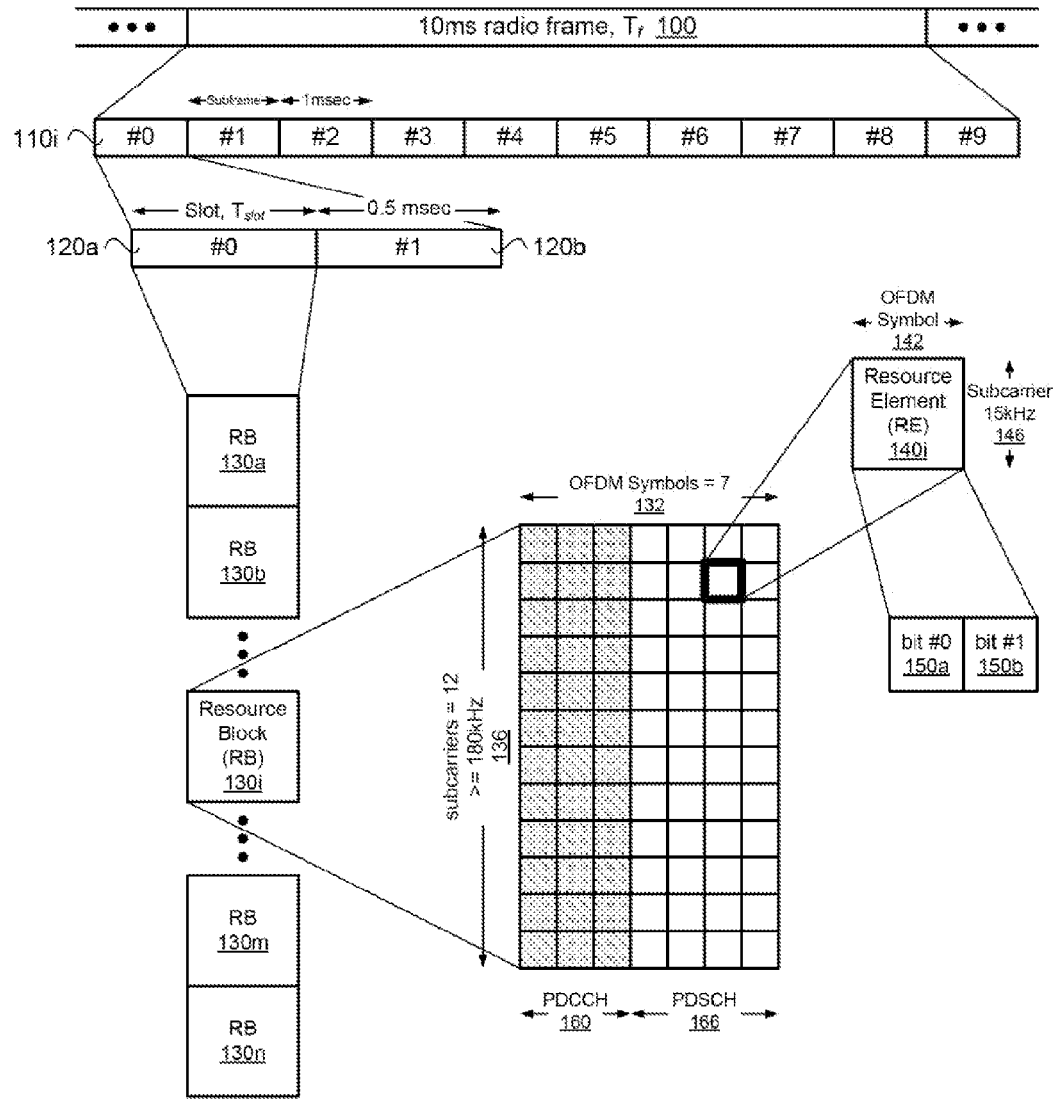
FIG. 3 illustrates a diagram of radio frame resources (e.g., a resource grid) for a downlink (DL) transmission including a legacy physical downlink control channel (PDCCH) in accordance with an example.

In one example, the resource elements (REs) can represent elements of a radio frame structure transmitted on the physical (PHY) layer in a downlink transmission between a node (e.g., eNodeB) and the wireless device (e.g., UE) using a generic 3GPP long term evolution (LTE) frame structure, as illustrated in FIG. 3.

FIG. 3 illustrates a downlink radio frame structure type 1. In the example, a radio frame 100 of a signal used to transmit the data can be configured to have a duration, Tf, of 10 milliseconds (ms). Each radio frame can be segmented or divided into ten subframes 110i that are each 1 ms long. Each subframe can be further subdivided into two slots 120a and 120b, each with a duration, Tslot, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130i can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 4A:
FIG. 4A illustrates a block diagram of a single-input single-output (SISO) wireless network in accordance with an example.
Figure 4B:
FIG. 4B illustrates a block diagram of a single-input multiple-output (SIMO) wireless network in accordance with an example.
Figure 4C:
FIG. 4C illustrates a block diagram of a multiple-input single-output (MISO) wireless network in accordance with an example.
Figure 4D:
FIG. 4D illustrates a block diagram of a multiple-input multiple-output (MIMO) wireless network in accordance with an example.

FIG. 4A illustrates a wireless communication system using a single radio channel on a transmitting antenna port 810 and a single radio channel on receiving antenna port 830, which can be called a single-input single-output (SISO) wireless network. FIG. 4B illustrates a wireless communication system using a single radio channel 810 on a transmitting antenna port and multiple radio channels on a number of receiving antenna ports 840, which can be called a single-input multiple-output (SIMO) wireless network. FIG. 4C illustrates a wireless communication system using multiple radio channels on a number of transmitting antenna ports 820 and a single radio channel on a receiving antenna port 830, which can be called a multiple-input single-output (MISO) wireless network. FIG. 4D illustrates a wireless communication system using multiple radio channels on a number of transmitting antenna ports 820 and multiple radio channels on a number of receiving antenna ports 840, which can be called a multiple-input multiple-output (MIMO) wireless network. The terms input and output typically refers to the radio channel carrying the signal, and not to the devices having antennas.

A MIMO wireless network can be used for beamforming. Beamforming or spatial filtering is a signal processing technique used in antenna arrays for directional signal transmission or reception. Beamforming can be achieved by combining elements in a phased array in such a way that signals at particular angles experience constructive interference while others experience destructive interference. Beamforming can be used at both the transmitting and receiving ends in order to achieve spatial selectivity.

A way to increase the spectral efficiency (SE) in the wireless network (e.g., cellular systems) is utilizing a large number of antennas that employed at a base station or node (e.g., eNB). Massive MIMO can refer a number of antennas in the large antenna array exceeding eight (8) antennas, such as 16, 32, or 64 antennas. Spectral efficiency (SE) spectrum efficiency or bandwidth efficiency refers to the information rate that can be transmitted over a given bandwidth in a specific communication system. SE can be a measure of how efficiently a limited frequency spectrum is utilized by the physical layer protocol, and sometimes by the media access control (the channel access protocol).

Dirty paper coding (DPC) can be an optimal data transmission scheme for a MIMO broadcast channel. Although DPC can maximize the rate and achieve Shannon capacity, the implementation can have a high degree of complexity. DPC is a technique for efficient transmission of digital data through a channel subjected to some interference known to the transmitter. The technique can consist of precoding the data in order to cancel the effect caused by the interference. Dirty-paper coding can achieve a channel capacity, without a power penalty and without requiring a receiver to gain knowledge of the interference state. Channel capacity is the tightest upper bound on the rate of information that can be reliably transmitted over a communications channel. By a noisy-channel coding theorem, the channel capacity of a given channel is the limiting information rate (in units of information per unit time) that can be achieved with arbitrarily small error probability. Information theory or Shannon capacity defines the notion of channel capacity and provides a mathematical model by which channel capacity can be computed. A result of Shannon capacity states that the capacity of the channel can be given by a maximum of the mutual information between an input and an output of the channel, where the maximization is with respect to the input distribution.

Precoding can be a generalization of beamforming to support multi-stream (or multi-layer) transmission in multi-antenna wireless communications. For example, in single-stream beamforming, a same signal can be emitted from each of the transmit antennas with appropriate weighting (e.g., phase and gain) such that the signal power can be maximized at a receiver output. When a receiver has multiple antennas, single-stream beamforming may not simultaneously maximize the signal level at all of the receive antennas. To maximize the throughput in multiple receive antenna systems, multi-stream transmission can be used, which can be provided by precoding.

Several suboptimal linear precoding schemes have been proposed. Although for a fixed number of users, the rates resulting from various suboptimal linear precoding schemes may be less than the channel capacity, linear precoding schemes can achieve channel capacity asymptotically (i.e., when a number of users goes to infinity). Two linear precoding schemes include zero-forcing beamforming (ZFBF) and random beamforming (RBF).

With ZFBF, a beam used for data transmission to one user (e.g., UE) can be designed in such a way that the beam lies in the null space of the space formed by the other users' channel vectors. For example, in a cell consisting of K users if $v_k$ is the vector used to serve user k and $h_i$ is the channel to any other user i, $v_k$ and $h_i$ can be orthogonal (i.e., $v_k \perp h_i$). The beamforming vectors $v_k$ can be calculated at the base station (eNB) by forming channel matrix whose columns are channel vectors $h_1, h_2, \ldots h_k$, taking the inverse of channel matrix and normalizing the columns of the resulting matrix. As a result. ZFBF can remove or cancel inter-user intra-cell interference when the channel information for all the users in the cell is known at the node (e.g., eNB). However, in practical cellular systems some interference may remain because the channel information at the node (e.g., eNB) may not be perfect. The imprecise channel information can be due to the channel estimation at the user based on the reference signal and then quantized to be sent to the base station. Both the channel estimation and the quantization processes can introduce some error to the channel information. Moreover, another difficulty in ZFBF can be user selection and pairing which can introduce complexity when the number of active users in the cell is large.

Quantization is the process of mapping a large set of input values to a smaller set, such as rounding values to some unit of precision. A device or algorithmic function that performs quantization is called a quantizer. The round-off error introduced by quantization is referred to as quantization error. For example, an optimal beam may be quantized to a discrete index of the optimal beam, such as a precoding matrix indicator (PMI). In another example, a signal-to-interference-plus-noise ratio (SINR) for the optimal beam may be quantized to a discrete SINR value, such as a channel quality indicator (CQI).

The PMI can be a signal fed back by the UE to support a multiple-input multiple-output (MIMO) operation. The PMI can correspond to an index of the precoder (within a codebook shared by the UE and eNodeB), which can maximize an aggregate number of data bits which can be received across all downlink spatial transmission layers. The CQI can be signaled by a UE to the eNodeB to indicate a suitable data rate, such as a modulation and coding scheme (MCS) value, for downlink transmissions, which can be based on a measurement of the received downlink signal to interference plus noise ratio (SINR) and knowledge of the UE's receiver characteristics. A signal-to-noise-and-interference ratio (SINR) or signal-to-interference ratio (S/I or SIR), also known as the carrier-to-interference ratio (C/I, CIR), refers to the quotient between the average received modulated carrier power S or C and the average received co-channel interference power I (i.e., cross-talk, from other transmitters than the useful signal).

Another approach for linear precoding is random beamforming (RBF). In RBF each user (e.g., UE) can calculate an optimal beam (among a set of orthogonal beams) by maximizing the optimal beam's received SINR and report an index of the optimal beam (e.g., PMI) along with the optimal SINR (e.g., CQI). The node can then select one user per beam based on the SINR values and serve those users with the beams the users requested. As a result, user selection and scheduling process at the node can be simplified over other linear precoding schemes. Furthermore, a beamforming vector calculation may not be needed at the node. Moreover, because the same beam can be used for an SINR calculation by the user and data transmission at the node, reduced to no mismatch may occur between reference signals used in the SINR calculation and data transmission for RBF. However, inter-user intra-cell interference may not be cancelled using RBF (e.g., unlike ZFBF), because the beam for one user may not be orthogonal to a channel of other users. In addition, as users assume that the other beams can be used in data transmission phase, the calculated SINRs (e.g., CQIs) based on RBF can be considered pessimistic. Conversely, the calculated SINRs (e.g., CQIs) based on ZFBF can be considered optimistic (especially, relative to RBF). In an example, a pessimistic SINR can provide a lower bound on the SINR and an optimistic SINR can provide an upper bound on the SINR.

In an example, a wireless system can use adaptive technology or hybrid ZFBF and RBF technology using both ZFBF and RBF, which can be used to improve system performance. The adaptive technology or hybrid ZFBF and RBF technology can include methods, computer circuitry, systems, user equipments (UEs), or nodes (e.g., eNB).

Figure 5:
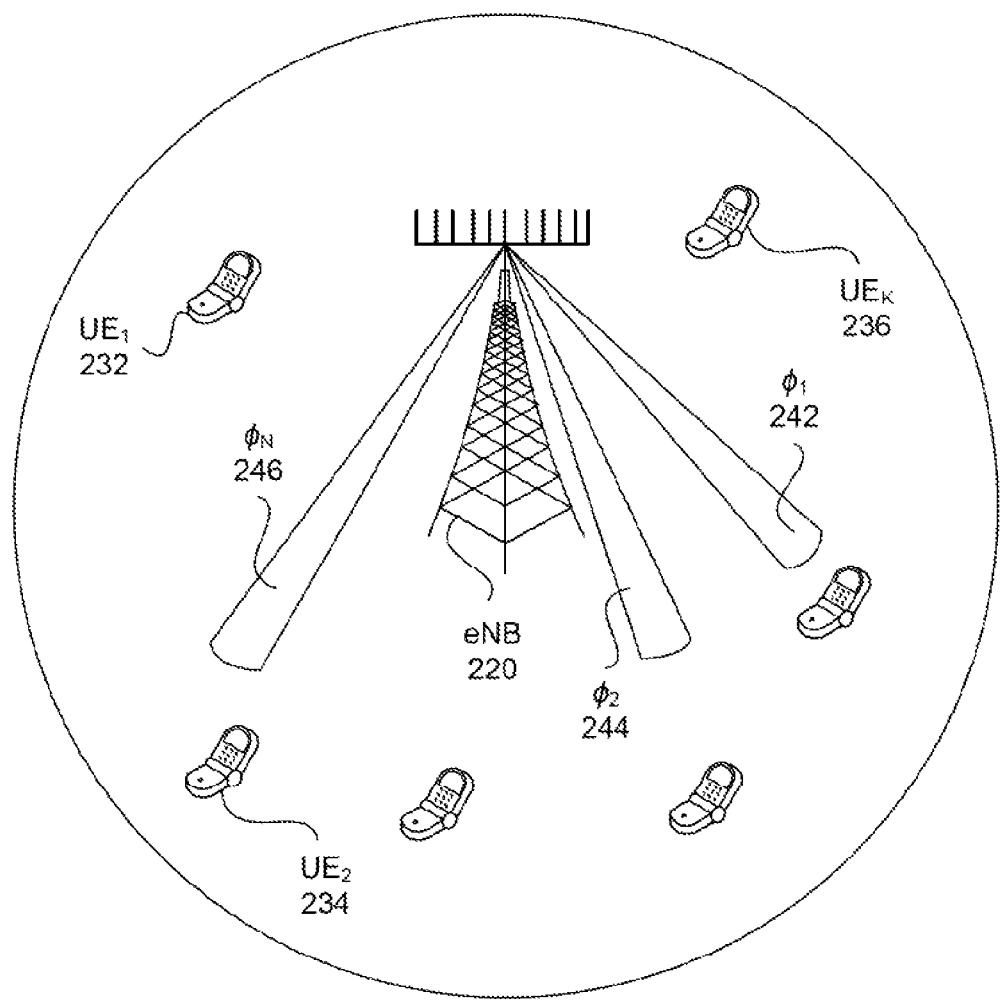
FIG. 5 illustrates a diagram of an evolved Node B (eNB) using different beams to send signals to multiple users (e.g., UEs) in accordance with an example.

FIG. 5 illustrates a system with eNB 220 equipped with M transmit antennas (e.g., M can be much greater than eight antennas (M>>8), such as 16, 32, or 62 antenna) and K users (e.g., UEs) 232, 234, and 236. The eNB can generate N beams 242, 244, and 246. In an example, the codebook for channel quantization and precoding matrix indicator (PMI) reporting can include of N M×1 vectors (e.g., codewords), $\phi_n$, where N can be less than, equal to, or greater than M, where N is the number of beams and M is the number of transmit antennas. In another example, two codebooks may be used for precoding. For instance, one "coarse codebook" with a small number of codewords (e.g., low density codebook) can be used to track large variations in the channel and, one "fine codebook" with a larger number of codewords (e.g., high density codebook) can be used for better resolution and more accurate channel reporting.

In a simple RBF example, each UE can calculate its optimal channel direction (PMI) using a codebook known to both the eNB and the UE. Moreover, each UE can estimate a downlink SINR by assuming that the signal transmitted to the UE is beamformed by a reported PMI direction to the eNB from the UE and by assuming that other UEs are each served on one of the other beam directions (codewords) (e.g., one UE served by one other beam). For example, each UE k can first obtain an estimated channel $\hat{h}_k$ from the received reference signals (e.g., pilots) and then multiple downlink SINRs may be calculated at the UE assuming that the UE is served by beam $\phi_n$ and other UEs in the cell are served by other beams $\phi_i$, $i \neq n$, which can be represented as Expression 1.

$$SINR_{n,k} = \frac{|\hat{h}_k \phi_{n^*}|^2}{1 + \sum_{i=1, j \neq n^*}^{N} |\hat{h}_k \phi_i|^2 + \text{Intercell Interference}}, \quad [\text{Expression 1}]$$

$$n = 1, 2, \ldots, N$$

Consequently, optimal SINR (CQI) can be represented by Expression 2 and the PMI is the index of $\phi_{n^*}$ which maximizes $SINR_{n,k}$ over n.

$$SINR_k^* = \max_n SINR_{n,k} = \quad [\text{Expression 2}]$$

$$\frac{|\hat{h}_k \phi_{n^*}|^2}{1 + \sum_{i=1, j \neq n^*}^{N} |\hat{h}_k \phi_i|^2 + \text{Intercell Interference}}$$

For expressions 1 and 2 the beams can be assumed not to be reused in the neighboring interfering cells. The UEs in the cell can send a PMI and an optimal SINR (e.g., CQI) information to the eNB. The PMI can be associated with the CQI. The eNB can then select in each beam the UE with highest SINR, and therefore, the effective downlink SINR for UE k can be represented by Expression 3.

$$SINR_k = \frac{|\hat{h}_k \phi_{n^*}|^2}{1 + \sum_{i=1, j \neq n^*}^{N} |\hat{h}_k \phi_i|^2 + \text{Intercell Interference}} \quad [\text{Expression 3}]$$

In a simple ZFBF example, each UE k can estimate its channel $\hat{h}_k$ from downlink reference signals (pilots) first (similar to RBF, described above). Then, the UE can estimate multiple downlink SINRs assuming different beams $\phi_n$ can be used for data transmission. With ZFBF, the UE may not know a final beamforming decision at the eNB, the UE may only calculate single-user (SU) SINRs as represented by Expression 4.

$$\tilde{S}INR_{n,k} = \frac{|\hat{h}_k \phi_{n^*}|^2}{1 + \text{Intercell Interference}},$$
$$n = 1, 2, \ldots, N$$

[Expression 4]

Consequently, optimal SINR (CQI) can be represented by Expression 5 and PMI is the index of $\phi_{n^*}$ which maximizes $\tilde{S}INR_{n,k}$ over n.

$$\tilde{S}INR_k^* = \max_n \tilde{S}INR_{n,k} = \frac{|\hat{h}_k \phi_{n^*}|^2}{1 + \text{Intercell Interference}}$$

[Expression 5]

Next, in a data transmission, the eNB can perform user selection and pairing, and calculate beams such that $v_k \perp \phi_{i^*}$ ($v_k$ and $\phi_i^*$ are orthogonal) for all i≠k. For ZFBF, the effective downlink SINR for UE k can be represented by Expression 6.

$$SINR_k = \frac{|h_k v_k|^2}{1 + \sum_{i=1,i\neq k}^{N} |h_k v_i|^2 + \text{Intercell Interference}}$$

[Expression 6]

As previously discussed, one benefit of RBF relative to ZFBF is that RBF can have lower complexity in terms of user selection, scheduling and beamforming calculation at the eNB. Furthermore, RBF CQI can be calculated by the UE based on a multi-user (MU) assumption (e.g., expression 1), and RBF may not have a SINR mismatch (other than channel mismatch) when all the beams are used and one UE per beam is served (e.g., total of N UEs) as can be seen from expression 3. On the other hand, the ZFBF CQI calculation can be based on a single user (SU) (e.g., expression 4) and as a result some interference mismatch in addition to the channel mismatch can occur, as can be observed in expression 6.

However, RBF can have a low data rate per UE as the calculated SINR at each UE assumes N−1 other UEs are served in the same resource, which can result in a large interference power in the denominator of $SINR_{n,k}$ (expression 1). In some cases larger SINRs and throughputs may be achievable by serving fewer UEs as serving fewer UEs can reduce the interference in the system.

Therefore, depending on an amount of overhead and system complexity, several hybrid ZFBF/RBF schemes can be used.

Figure 6:
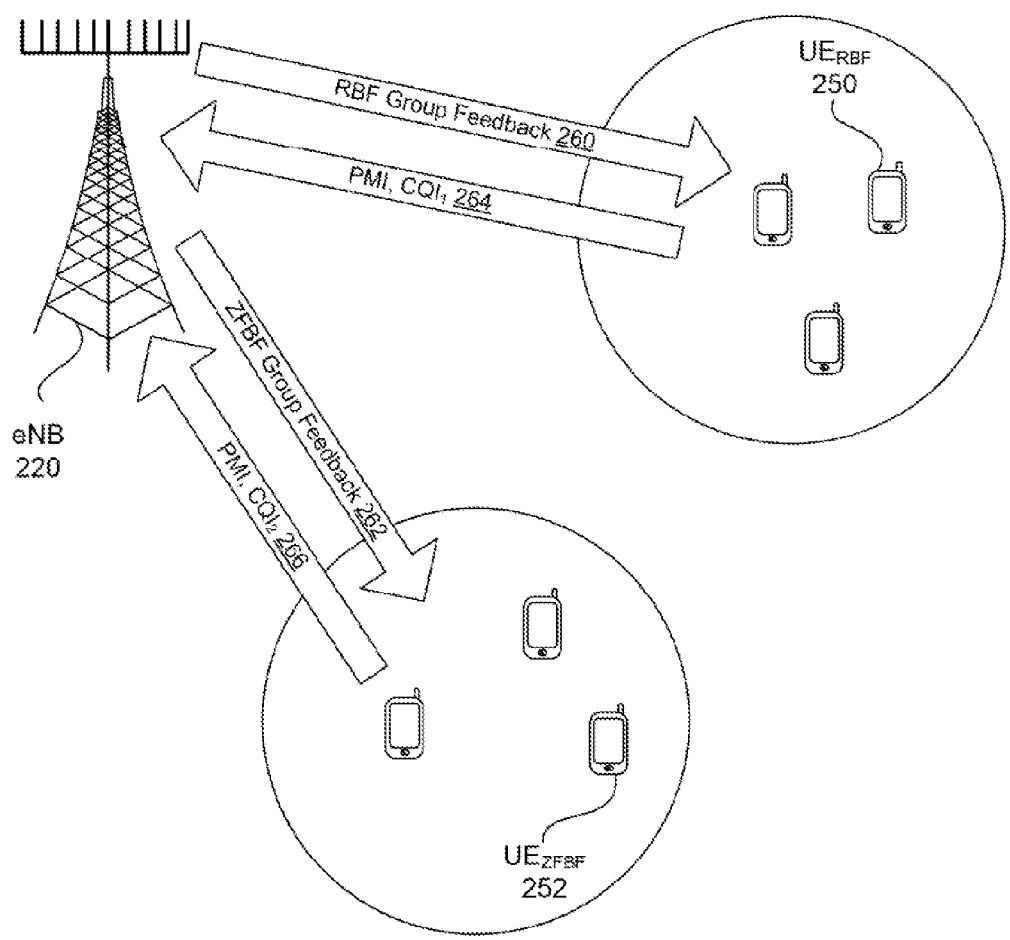
FIG. 6 illustrates a diagram of grouping user equipments (UEs) into zero-forcing beamforming (ZFBF) and random beamforming (RBF) groups in accordance with an example.

In an example (alternative 1), a UE can feed back PMI along with either a CQI$_1$ (CQI assuming RBF) or a CQI$_2$ (CQI assuming ZFBF). FIG. 6 illustrates alternative 1, where UEs can be divided into two groups by the eNB based on the UE's channel condition, average throughput, or other similar criteria. In an example, the grouping can be signaled to the UE through downlink control channel (e.g., RBF group feedback 260 and ZFBF group feedback 262). UEs (e.g., UE$_{RBF}$ 250) in a first group (e.g., RBF group) can feedback "PMI and CQI$_1$" 264 (Expressions 7 and 8) and UEs (e.g., UE$_{ZFBF}$ 252) in a second group (e.g., ZFBF group) can feedback "PMI and CQI$_2$" 266 (Expressions 7 and 9) where:

$$PMI: \phi_{n^*}$$

[Expression 7]

$$CQI_1: \tilde{S}INR_k^* =$$

[Expression 8]

$$\frac{|\hat{h}_k \phi_{n^*}|^2}{1 + \sum_{i=1,j\neq n^*}^{N} |\hat{h}_k \phi_i|^2 + \text{Intercell Interference}}$$

$$CQI_2: \tilde{S}INR_k^* = \frac{|\hat{h}_k \phi_{n^*}|^2}{1 + \text{Intercell Interference}}$$

[Expression 9]

The eNB then has two options: In a first option for alternative 1, the eNB can select RBF group and serves the UEs (e.g., UE$_{RBF}$ 250) in the RBF group by using RBF. In a second option for alternative 1, the eNB can select a subset of UEs (e.g., UE$_{ZFBF}$ 252) in the ZFBF group (e.g., by greedy user selection and proportional fairness scheduling (PFS)) and serve the UE$_{ZFBF}$ using ZFBF.

Among options 1 and 2 for alternative 1, the eNB can choose an optimal linear precoding scheme depending on an objective function or criteria, such as maximizing overall throughput, maximizing per user throughput, or minimizing delay. Contrary to simple RBF, in the first option mismatch can occur if the number of UEs in RBF group is less than number of beams N. The number of dropped packets or error messages may determine if RBF or ZFBF is used.

Proportional fairness is a compromise-based scheduling algorithm, which is based upon maintaining a balance between two competing interests: Trying to maximize total wireless network throughput while at the same time allowing all users at least a minimal level of service. Greedy user selection or greedy opportunistic scheduling can provide scheduling for the UEs that can provide a higher throughput, which can lead to a severe transmission starvation issue for UEs with poor SINR (or data throughput).

In an example (alternative 2), a UE can feed back PMI along with both a CQI$_1$ (CQI assuming RBF) and a CQI$_2$ (CQI assuming ZFBF) (Expressions 10-12). In alternative 2, the UEs can feedback "PMI, CQI$_1$ and CQI$_2$".

$$PMI: \phi_{n^*}$$

[Expression 10]

$$CQI_1: \tilde{S}INR_k^* =$$

[Expression 11]

$$\frac{|\hat{h}_k \phi_{n^*}|^2}{1 + \sum_{i=1,i\neq n^*}^{N} |\hat{h}_k \phi_i|^2 + \text{Intercell Interference}}$$

$$CQI_2: \tilde{S}INR_k^* = \frac{|\hat{h}_k \phi_{n^*}|^2}{1 + \text{Intercell Interference}}$$

[Expression 12]

The eNB has two options for data transmission: In a first option, the eNB can consider PMI and CQI$_1$ and apply RBF and serve one UE per beam. In a second option, the eNB can consider PMI and CQI$_2$, select users based on some criteria (e.g., greedy and proportional fairness scheduling) and perform ZFBF. Among options 1 and 2 for alternative 2, the eNB can choose an optimal one depending on some objective function and criteria, such as maximizing overall throughput, maximizing per user throughput, or minimizing delay.

Figure 7:
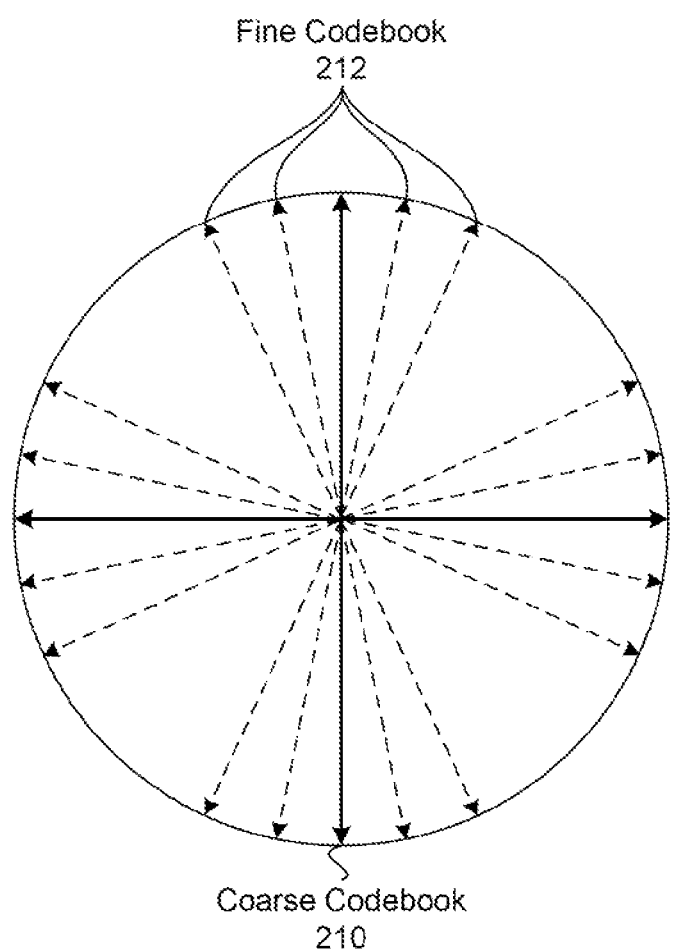
FIG. 7 illustrates a diagram of beam angles of a fine codebook relative to a course codebook in accordance with an example.
Figure 8:
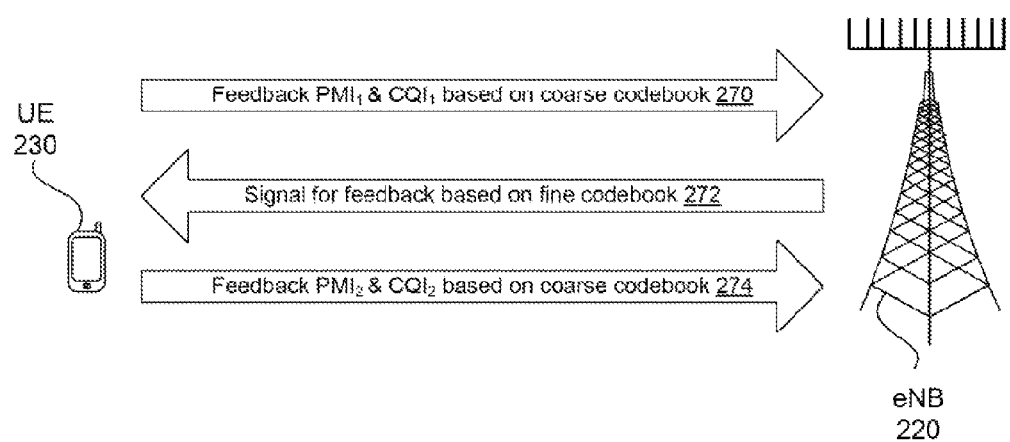
FIG. 8 illustrates a diagram of coarse and fine codebook feedback where each precoding matrix indicator (PMI) is associated with one channel quality indicator (CQI) in accordance with an example.

In an example (alternative 3), a UE can feed back PMI$_1$ along with a CQI$_1$ (CQI assuming RBF) and optionally feed back PMI$_2$ along with a CQI$_2$ (CQI assuming ZFBF). FIG. 7 illustrates beam angles of a fine codebook 212 relative to a course codebook 210. FIG. 8 illustrates alternative 3, where each UE 230 uses a low density codebook (e.g., course codebook) and calculates and feeds back PMI$_1$, CQI$_1$ 270 (Expressions 13 and 14). For alternative 3, the eNB 220 can uses the course feedback information from the UEs and serve N UEs using RBF for data transmission. Depending on the environment and system criteria, the eNB can ask the UEs to use a high density codebook (e.g., fine codebook) 272 and the UEs can send PMI$_2$ and CQI$_2$ 274 (Expressions 15 and 16). In alternative 3, the eNB can subsequently perform ZFBF for data transmission after initially performing RBF using the course codebook for data transmission.

PMI$_1$: $\phi_{n^*}$, coarse quantization [Expression 13]

$$CQI_1: \overline{S}INR_k^* = \frac{|\hat{h}_k \phi_{n^*}|^2}{1 + \sum_{i=1, i \neq n^*}^{N} |\hat{h}_k \phi_i|^2 + \text{Intercell Interference}}$$ [Expression 14]

PMI$_2$: $\phi'_{n^*}$, fine quantization [Expression 15]

$$CQI_2: \overline{S}INR_k^{\prime*} = \frac{|\hat{h}_k \phi'_{n^*}|^2}{1 + \text{Intercell Interference}}$$ [Expression 16]

Depending on the system design, in alternative 3, UEs can either send PMI$_2$ and CQI$_2$ or use differential coding and signal the $\Delta$PMI=PMI$_2$–PMI$_1$ and $\Delta$CQI=CQI$_2$–CQI$_1$. Thus, a fine quantization can use a static fine codebook or a differential codebook based on the coarse quantization.

Figure 9:
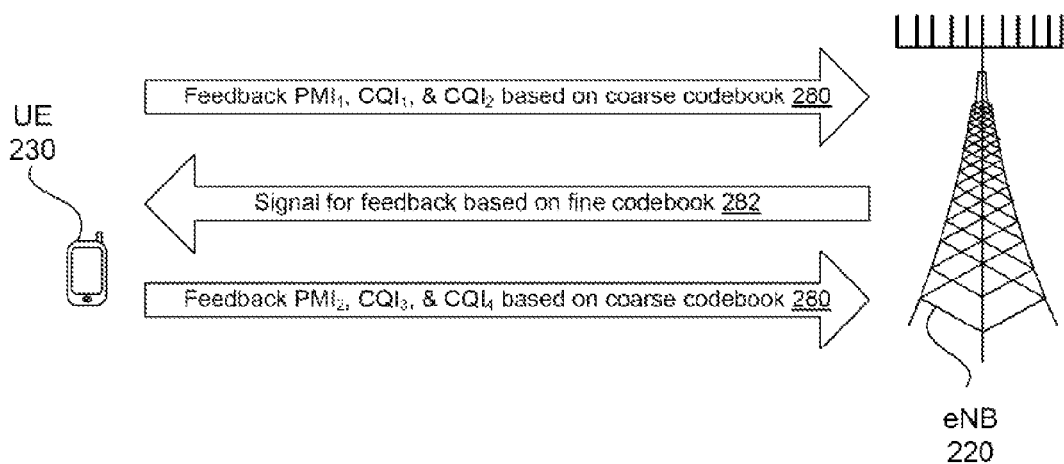
FIG. 9 illustrates a diagram of coarse and fine codebook feedback where each precoding matrix indicator (PMI) is associated with two channel quality indicators (CQIs) in accordance with an example.

In an example (alternative 4), a UE can feed back PMI$_1$ along with both a CQI$_1$ (CQI assuming RBF) and a CQI$_2$ (CQI assuming ZFBF), and optionally feed back PMI$_2$ along with both a CQI$_3$ (CQI assuming RBF) and a CQI$_4$ (CQI assuming ZFBF). FIG. 9 illustrates alternative 4, where each UE 230 uses a low density codebook (e.g., course codebook) and calculates and feeds back PMI$_1$, CQI$_1$, and CQI$_2$ 280 (Expressions 17-19). For alternative 4, the eNB 220 can uses the course feedback information from the UEs and serve N UEs using RBF or ZFBF for data transmission. Depending on the environment and system criteria, the eNB can ask the UEs to use a high density codebook (e.g., fine codebook) 282 and the UEs can feed back PMI$_2$, CQI$_3$, and CQI$_4$ 284 (Expressions 20-22). In alternative 4, the eNB can subsequently perform RBF or ZFBF using a fine codebook for data transmission after initially performing RBF or ZFBF using the course codebook for data transmission. Alternative 4 is similar to alternative 3 with some additional feedback, as shown in FIG. 9.

PMI$_1$: $\phi_{n^*}$, coarse quantization [Expression 17]

$$CQI_1: \overline{S}INR_k^* = \frac{|\hat{h}_k \phi_{n^*}|^2}{1 + \sum_{i=1, i \neq n^*}^{N} |\hat{h}_k \phi_i|^2 + \text{Intercell Interference}}$$ [Expression 18]

$$CQI_2: \overline{S}INR_k^* = \frac{|\hat{h}_k \phi'_{n^*}|^2}{1 + \text{Intercell Interference}}$$ [Expression 19]

PMI$_2$: $\phi'_{n^*}$, fine quantization [Expression 20]

$$CQI_3: \overline{S}INR_k^{\prime*} = \frac{|\hat{h}_k \phi_{n^*}|^2}{1 + \sum_{i=1, i \neq n^*}^{N} |\hat{h}_k \phi_i|^2 + \text{Intercell Interference}}$$ [Expression 21]

$$CQI_4: \overline{S}INR_k^{\prime*} = \frac{|\hat{h}_k \phi'_{n^*}|^2}{1 + \text{Intercell Interference}}$$ [Expression 22]

Depending on the system design, in alternative 4, UEs can either send PMI$_2$, CQI$_3$, and CQI$_4$ or use differential coding and signal the $\Delta$PMI=PMI$_2$–PMI$_1$, $\Delta$CQI$_{RBF}$=CQI$_3$–CQI$_1$, and $\Delta$CQI$_{ZFBF}$=CQI$_4$–CQI$_2$. Thus, a fine quantization can use a static fine codebook or a differential codebook based on the coarse quantization.

Each UE can use the low density codebook (e.g., course codebook), as illustrated in FIG. 7, and calculate and feed back PMI$_1$, CQI$_1$, and CQI$_2$. With alternative 4, eNB has two options for data transmission and can select an optimal one based on the feedback. In option 1 for alternative 4, the eNB can consider PMI$_1$ and CQI$_1$ and apply RBF and serve one UE per beam. In option 2 for alternative 4, the eNB can consider PMI$_1$ and CQI$_2$, select UEs based on some criteria (e.g., greedy and proportional fairness scheduling) and perform ZFBF.

Depending on the environment and system criteria, the eNB can request UEs to use a high density codebook (e.g., fine codebook) and the UEs can feed back PMI$_2$, CQI$_3$, and CQI$_4$. For alternative 4, the eNB again has two options for data transmission and can choose an optimal one based on the feedback. In option 3 for alternative 4, the eNB can consider PMI$_2$ and CQI$_3$ and apply RBF and serve one UE per beam. In option 4 for alternative 4, the eNB can consider PMI$_2$ and CQI$_4$, select UEs based on some criteria (e.g., greedy and proportional fairness scheduling) and perform ZFBF.

Selecting between alternatives 1-4 can depend on system requirements and balancing between overhead and throughput. The feedback from PMIs and CQIs of alternatives 1-4 can add additional overhead, where alternative 4 has the greatest amount of feedback and overhead of the alternatives and alternative 1 has the least amount of feedback and overhead of the alternatives. Due to the lower overhead of alternative 1, alternative 1 may have a greater data transmission throughput relative to the other alternatives.

Figure 10:
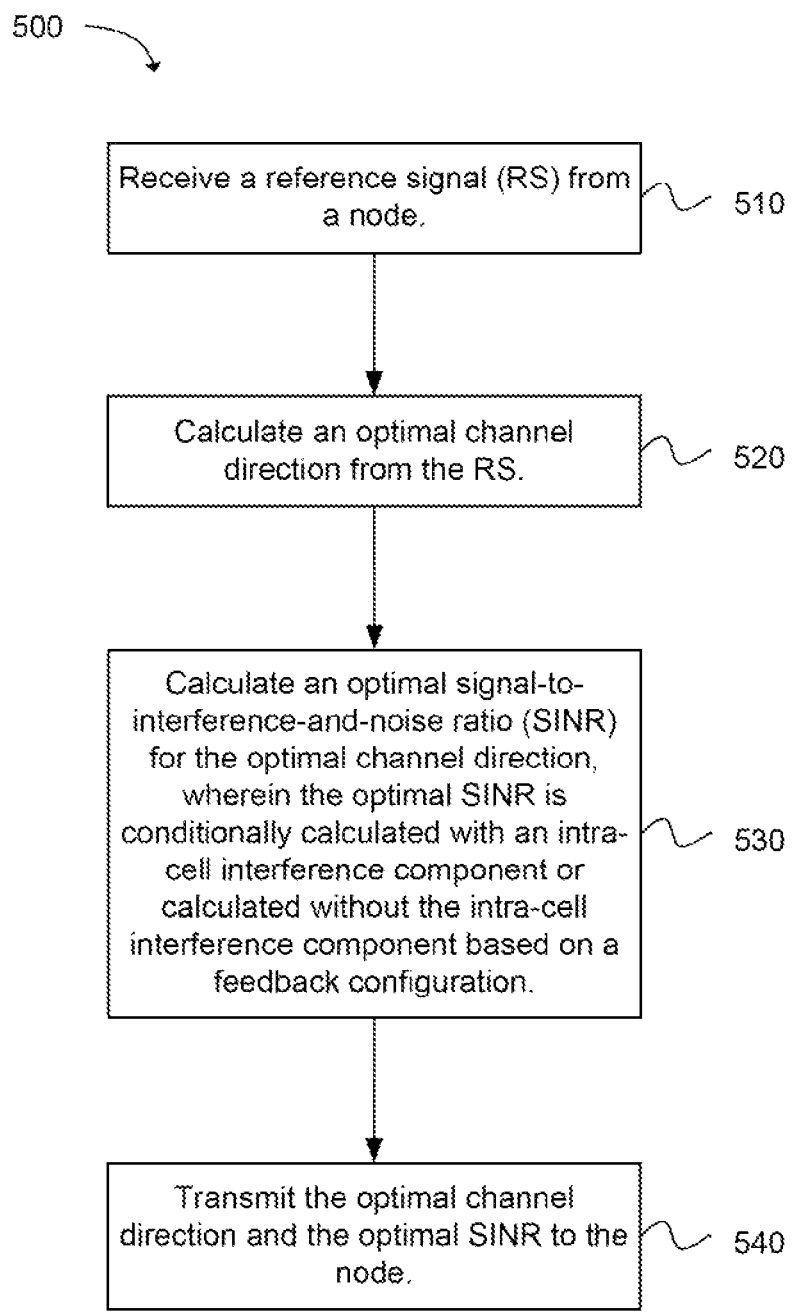
FIG. 10 depicts functionality of computer circuitry of a user equipment (UE) operable to provide hybrid beamforming feedback in accordance with an example.

Another example provides functionality 500 of computer circuitry of a processor on a user equipment (UE) operable to provide hybrid beamforming feedback, as shown in the flow chart in FIG. 10. The functionality may be implemented as a method or the functionality may be executed as instructions on a machine, where the instructions are included on at least one computer readable medium or one non-transitory machine readable storage medium. The computer circuitry can be configured to receive a reference signal (RS) from a node, as in block 510. The computer circuitry can be further configured to calculate an optimal channel direction from the RS, as in block 520. The computer circuitry can also be configured to calculate an optimal signal-to-interference-plus-noise ratio (SINR) for the optimal channel direction, wherein the optimal SINR is conditionally calculated with an intra-cell interference component or calculated without the intra-cell interference component based on a feedback configuration, as in block 530. The computer circuitry can be further configured to transmit the optimal channel direction and the optimal SINR to the node, as in block 540.

In an example, the optimal SINR calculated with the intra-cell interference component can be represented by $$\tilde{SINR}_k^* = \max_n \tilde{SINR}_{n,k} = \frac{|\hat{h}_k \phi_{n^*}|^2}{1 + \sum_{i=1, i \neq n^*}^{N} |\hat{h}_k \phi_i|^2 + \text{Intercell Interference}}$$

and converted into a channel quality indicator (CQI) accounting for intra-cell interference ($CQI_1$), and the optimal SINR calculated with the intra-cell interference component is transmitted in the $CQI_1$, where $|\hat{h}_k \phi_{n^*}|^2$ represents a received signal power, $\Sigma_{i=1, i \neq n^*}^{N} |\hat{h}_k \phi_i|^2$ represents the intra-cell interference component power, $\hat{h}_k$ is an estimated channel of the received RS for the UE k, N is a number of UEs served by the node and n=1, 2, ..., N, $\phi_{n^*}$ is a precoding matrix indicator (PMI) that maximizes $\tilde{S}INR_{n,k}$, and $\phi_i$ is the interference from other beams. The optimal SINR calculated without the intra-cell interference component can be represented by $$\tilde{SINR}_k^* = \max_n \tilde{SINR}_{n,k} = \frac{|\hat{h}_k \phi_{n^*}|^2}{1 + \text{Intercell Interference}}$$

and converted into a CQI without accounting for intra-cell interference ($CQI_2$), and the optimal SINR calculated without the intra-cell interference component is transmitted in the $CQI_2$.

In another example, the optimal SINR calculated with the intra-cell interference component can be calculated assuming a simple random beamforming (RBF) linear precoding mechanism, and the optimal SINR calculated without the intra-cell interference component can be calculated assuming a zero-forcing beamforming (ZFBF) linear precoding mechanism.

In another configuration, the computer circuitry configured to transmit the optimal SINR can be further configured to transmit both the optimal SINR calculated with the intra-cell interference component and the optimal SINR calculated without the intra-cell interference component.

In another example, the computer circuitry configured to transmit the optimal channel direction and the optimal SINR can be further configured to: Transmit a course quantization optimal channel direction and a course quantization optimal SINR calculated with the intra-cell interference component; receive a request from the node to use fine quantization; and transmit a fine quantization optimal channel direction and a fine quantization optimal SINR calculated without the intra-cell interference component.

In another configuration, the computer circuitry configured to transmit the optimal channel direction and the optimal SINR can be further configured to: transmit a course quantization optimal channel direction, a pessimistic course quantization optimal SINR calculated with the intra-cell interference component, and an optimistic course quantization optimal SINR calculated without the intra-cell interference component; receive a request from the node to use fine quantization; and transmit a fine quantization optimal channel direction, a pessimistic fine quantization optimal SINR calculated with the intra-cell interference component, and an optimistic fine quantization optimal SINR calculated without an intra-cell interference component.

Figure 11:
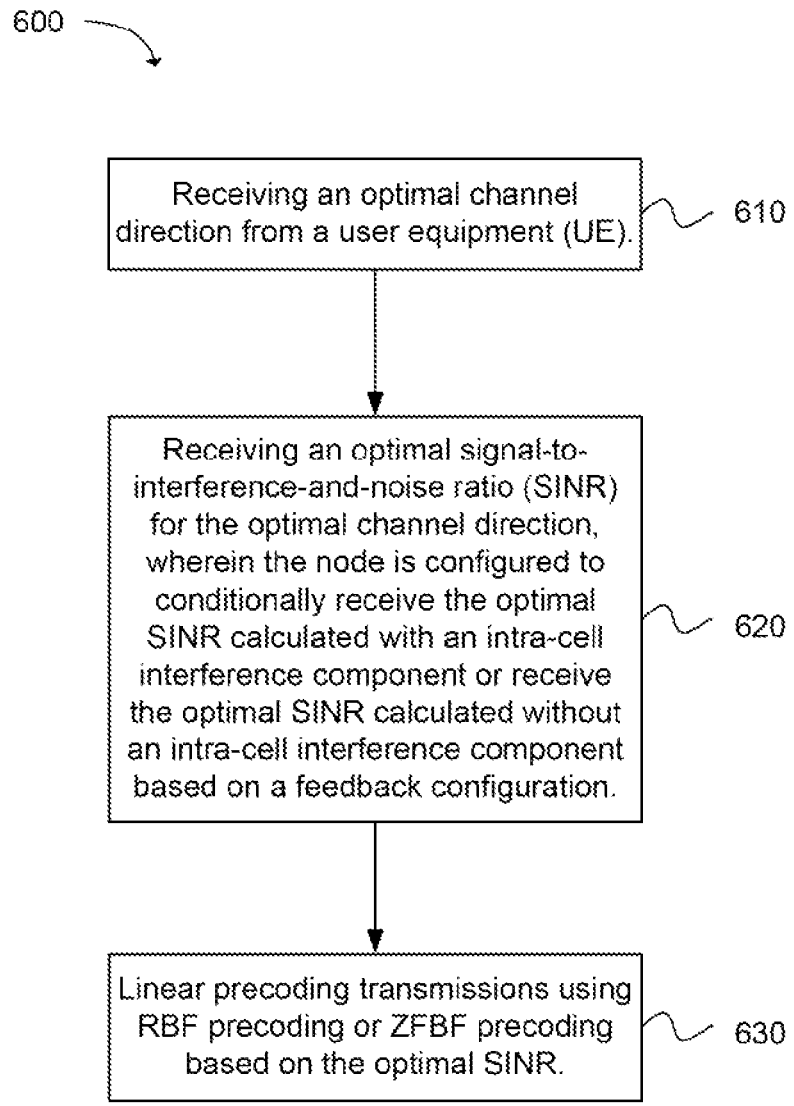
FIG. 11 depicts a flow chart of a method for receiving random beamforming (RBF) feedback and zero-forcing beamforming (ZFBF) feedback at a node in accordance with an example.

Another example provides a method 600 for receiving random beamforming (RBF) feedback and zero-forcing beamforming (ZFBF) feedback at a node, as shown in the flow chart in FIG. 11. The method may be executed as instructions on a machine, computer circuitry, or a processor for the node (e.g., eNB), where the instructions are included on at least one computer readable medium or one non-transitory machine readable storage medium. The method includes the operation of receiving an optimal channel direction from a user equipment (UE), as in block 610. The operation of receiving an optimal signal-to-interference-plus-noise ratio (SINR) for the optimal channel direction, wherein the node is configured to conditionally receive the optimal SINR calculated with an intra-cell interference component or receive the optimal SINR calculated without an intra-cell interference component based on a feedback configuration follows, as in block 620. The next operation of the method can be linear precoding transmissions using RBF precoding or ZFBF precoding based on the optimal SINR, as in block 630.

In an example, the method can further include transmitting a reference signal (RS) to the UE, wherein the optimal channel direction and the optimal SINR is determined from the RS. In another example, the method can further include: Selecting a RBF UE for a RBF group based on a criteria; and selecting a ZFBF UE for a ZFBF group based on the criteria. The criteria can improve a channel condition, maximize overall throughput, maximize per user throughput, or minimize delay. The operation of linear precoding transmissions can further include: Linear precoding transmissions of the RBF UE in the RBF group using the RBF precoding; and linear precoding transmissions of the ZFBF UE in the ZFBF group using the ZFBF precoding.

In another configuration, the operation of receiving the optimal SINR for the optimal channel direction can further include receiving both a pessimistic channel quality indicator (CQI) representing the optimal SINR calculated with the intra-cell interference component and an optimistic CQI representing the optimal SINR calculated without the intra-cell interference component.

In another example, the operation of receiving the optimal SINR for the optimal channel direction can further include: Receiving a course quantization precoding matrix indicator (PMI) representing a course quantization optimal channel direction and receiving a course quantization channel quality indicator (CQI) representing a course quantization optimal SINR calculated with the intra-cell interference component, where the course quantization PMI and the course quantization CQI are generated from a low density codebook; evaluating the course quantization optimal SINR against an environmental condition or a system criteria; transmitting a request to the UE to use fine quantization based on the course quantization optimal SINR; and receiving a fine quantization PMI representing a fine quantization optimal channel direction and receiving a fine quantization CQI representing a fine quantization optimal SINR calculated without the intra-cell interference component, where the fine quantization PMI and the fine quantization CQI are generated from a high density codebook. The operation of linear precoding transmissions can further include: Transmitting data using the RBF precoding for a RBF UE when a specified environmental condition threshold and a specified system criteria is not met; and transmitting data using the ZFBF precoding for a ZFBF UE when the specified environmental condition threshold or the specified system criteria is met.

In another configuration, the operation of receiving the optimal SINR for the optimal channel direction can further include: Receiving a course quantization precoding matrix indicator (PMI) representing a course quantization optimal channel direction, receiving a pessimistic course quantization channel quality indicator (CQI) representing a pessimistic course quantization optimal SINR calculated with the intra-cell interference component, and receiving an optimistic course quantization CQI representing an optimistic course quantization optimal SINR calculated without the intra-cell interference component, where the course quantization PMI, the pessimistic course quantization optimal SINR, and the optimistic course quantization CQI are generated from a low density codebook; evaluating the course quantization optimal SINR against an environmental condition or a system criteria; transmitting a request to the UE to use fine quantization based on the course quantization optimal SINR: and receiving a fine quantization precoding matrix indicator (PMI) representing a fine quantization optimal channel direction, receiving a pessimistic fine quantization CQI representing a pessimistic fine quantization optimal SINR calculated with the intra-cell interference component, and receiving an optimistic fine quantization CQI representing an optimistic fine quantization optimal SINR calculated without the intra-cell interference component, where the fine quantization PMI, the pessimistic fine quantization optimal SINR, and the optimistic fine quantization CQI are generated from a high density codebook. The operation of linear precoding transmissions can further include: Transmitting data using the RBF precoding based on a pessimistic optimal SINR when a specified environmental condition threshold and a specified system criteria is not met; and transmitting data using the ZFBF precoding based on an optimistic optimal SINR when the specified environmental condition threshold or the specified system criteria is met.

In another example, the optimal SINR calculated with the intra-cell interference component can be represented by $$\tilde{S}INR_k^* = \max_n \tilde{S}INR_{n,k} = \frac{|\hat{h}_k \phi_{n^*}|^2}{1 + \sum_{i=1, i \neq n^*}^{N} |\hat{h}_k \phi_i|^2 + \text{Intercell Interference}}$$

and converted into a channel quality indicator (CQI) accounting for intra-cell interference ($CQI_1$), and the optimal SINR calculated with the intra-cell interference component is transmitted in the $CQI_1$, where $|\hat{h}_k \phi_{n^*}|^2$ represents a received signal power, $\Sigma_{i=1, i \neq n^*}^{N} |\hat{h}_k \phi_i|^2$ represents the intra-cell interference component power, $\hat{h}_k$ is an estimated channel of the received RS for the UE k, N is a number of UEs served by the node and n=1, 2 . . . , N, $\phi_{n^*}$ is a precoding matrix indicator (PMI) that maximizes $\tilde{S}INR_{n,k}$, and $\phi_i$ is an interference from other beams. The optimal SINR calculated without the intra-cell interference component can be represented by $$\tilde{S}INR_k^* = \max_n \tilde{S}INR_{n,k} = \frac{|\hat{h}_k \phi_{n^*}|^2}{1 + \text{Intercell Interference}}$$

and converted into a CQI without accounting for intra-cell interference ($CQI_2$), and the optimal SINR calculated without the intra-cell interference component is transmitted in the $CQI_2$.

Figure 12:
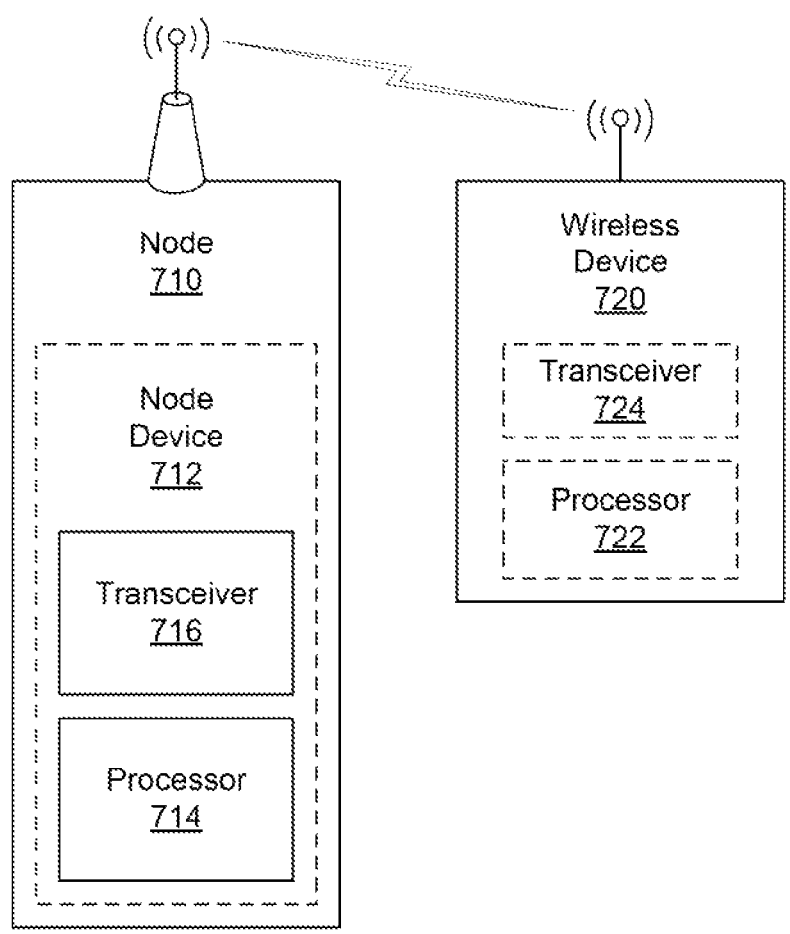
FIG. 12 illustrates a block diagram of a node (e.g., eNB) and wireless device (e.g., UE) in accordance with an example.

FIG. 12 illustrates an example node 710 (e.g., eNB) and an example wireless device 720 (e.g., UE). The node can include a node device 712. The node device or the node can be configured to communicate with the wireless device (e.g., UE). The node device can include a processor 714 and a transceiver 716. The processor 714 and/or transceiver 716 can be configured for receiving random beamforming (RBF) feedback and zero-forcing beamforming (ZFBF) feedback, as described in 600 of FIG. 11. In an example, the node can include M transmit antennas, where M>8 (i.e., number of transmit antennas is greater than eight antennas). The node can include a base station (BS), a Node B (NB), an evolved Node B (eNB), a baseband unit (BBU), a remote radio head (RRH), a remote radio equipment (RRE), a remote radio unit (RRU), or a central processing module (CPM).

The wireless device 720 (e.g., UE) can include a transceiver 724 and a processor 722. The wireless device (i.e., device) can be configured for hybrid beamforming feedback, as described in 500 of FIG. 10.

Referring back to FIG. 12, the transceiver 724 can be configured to receive a data transmission from a node (e.g., eNB). The processor 722 can be configured to: Calculate an optimal channel direction from the data transmission; generate a precoding matrix indicator (PMI) based on the optimal channel direction: calculate an optimal signal-to-interference-plus-noise ratio (SINR) for the optimal channel direction, where the optimal SINR is conditionally calculated with an intra-cell interference component or calculated without the intra-cell interference component based on a feedback configuration; generate a pessimistic channel quality indicator (CQI) when the optimal SINR is calculated with the intra-cell interference component; and generate an optimistic CQI when the optimal SINR is calculated without the intra-cell interference component. The transceiver can be further configured to: Transmit the PMI and the pessimistic CQI to the eNB; or transmit the PMI and the optimistic CQI to the eNB.

In another example, the PMI is represented by $\phi_{n^*}$, the pessimistic CQI ($CQI_1$) is represented by $$\tilde{S}INR_k^* = \max_n \tilde{S}INR_{n,k} = \frac{|\hat{h}_k \phi_{n^*}|^2}{1 + \sum_{i=1, i \neq n^*}^{N} |\hat{h}_k \phi_i|^2 + \text{Intercell Interference}},$$

and the optimistic CQI ($CQI_2$) is represented by $$\tilde{S}INR_k^* = \max_n \tilde{S}INR_{n,k} = \frac{|\hat{h}_k \phi_{n^*}|^2}{1 + \text{Intercell Interference}},$$

where $|\hat{h}_k \phi_{n^*}|^2$ represents a received signal power. $\Sigma_{i=1, i \neq n^*}^{N} |\hat{h}_k \phi_i|^2$ represents the intra-cell interference component power, $\hat{h}_k$ is an estimated channel of the received data transmission for the UE k, N is a number of UEs served by the eNB and n=1, 2 . . . , N, $\phi_{n^*}$ is a precoding matrix indicator (PMI) that maximizes $\tilde{S}INR_{n,k}$, and $\phi_i$ is an interference from other beams.

In another configuration, the transceiver 724 can be further configured to transmit both the pessimistic CQI and the optimistic CQI, where the PMI is represented by $\phi_{n^*}$, the pessimistic CQI ($CQI_1$) is represented by $$\tilde{S}INR_k^* = \max_n \tilde{S}INR_{n,k} = \frac{|\hat{h}_k \phi_{n^*}|^2}{1 + \sum_{i=1, i \neq n^*}^{N} |\hat{h}_k \phi_i|^2 + \text{Intercell Interference}}$$

and the optimistic CQI ($CQI_2$) is represented by $$\tilde{S}INR_k^* = \max_n \tilde{S}INR_{n,k} = \frac{|\hat{h}_k \phi_{n^*}|^2}{1 + \text{Intercell Interference}},$$

where $|\hat{h}_k\phi_{n*}|^2$ represents a received signal power, $\Sigma_{i=1,i\neq n*}^{N}|\hat{h}_k\phi_i|^2$ represents the intra-cell interference component power, $\hat{h}_k$ is an estimated channel of the received data transmission for the UE k, N is a number of UEs served by the eNB and n=1, 2, ..., N, $\phi_n*$ is a precoding matrix indicator (PMI) that maximizes $\tilde{S}$ INRn,k, and $\phi_i$ is an interference from other beams.

In another example, the processor 722 can be further configured to: Generate a course quantization PMI and a course quantization CQI based on a low density codebook; and generate a fine quantization PMI and a fine quantization CQI based on a high density codebook, where the course quantization PMI (PMI$_1$) is represented by $\phi_{n*}$, the course quantization CQI (CQI$_1$) uses the pessimistic CQI and is represented by $$\tilde{S}INR_k^* = \max_n \tilde{S}INR_{n,k} = \frac{|\hat{h}_k\phi_{n*}|^2}{1 + \sum_{i=1,i\neq n*}^{N}|\hat{h}_k\phi_i|^2 + \text{Intercell Interference}},$$

the fine quantization PMI (PMI$_2$) is represented by $\phi'_{n*}$, and the fine quantization CQI (CQI$_2$) uses the optimistic CQI and is represented by $$\tilde{S}INR'^*_k = \max_n \tilde{S}INR'_{n,k} = \frac{|\hat{h}_k\phi_{n*}|^2}{1 + \text{Intercell Interference}},$$

where $|\hat{h}_k\phi_{n*}|^2$ represents a received signal power for course quantization, $|\hat{h}_k\phi'_{n*}|^2$ represents a received signal power for fine quantization, $\Sigma_{i=1,i\neq n*}^{N}|\hat{h}_k\phi_i|^2$ represents the intra-cell interference component power, $\hat{h}_k$ is an estimated channel of the received data transmission for the UE k, N is a number of UEs served by the eNB and n=1, 2, ..., N, $\phi_{n*}$ is a precoding matrix indicator (PMI) that maximizes $\tilde{S}$ INRn,k, $\phi'_{n*}$ is a precoding matrix indicator (PMI) that maximizes $\tilde{S}$ INR'n,k and $\phi_i$ is an interference from other beams.

In another configuration, the processor 722 can be further configured to: Generate a course quantization PMI, a pessimistic course quantization CQI, and an optimistic course quantization CQI based on a low density codebook; and generate a fine quantization PMI, a pessimistic fine quantization CQI, and an optimistic fine quantization CQI based on a high density codebook, where the course quantization PMI (PMI$_1$) is represented by $\phi_{n*}$, the pessimistic course quantization CQI (CQI$_1$) is represented by $$\tilde{S}INR_k^* = \max_n \tilde{S}INR_{n,k} = \frac{|\hat{h}_k\phi_{n*}|^2}{1 + \sum_{i=1,i\neq n*}^{N}|\hat{h}_k\phi_i|^2 + \text{Intercell Interference}},$$

the optimistic course quantization CQI (CQI$_2$) is represented by $$\tilde{S}INR_k^* = \max_n \tilde{S}INR_{n,k} = \frac{|\hat{h}_k\phi_{n*}|^2}{1 + \text{Intercell Interference}},$$

the fine quantization PMI (PMI$_2$) is represented by $\phi'_{n*}$, the pessimistic fine quantization CQI (CQI$_3$) is represented by $$\tilde{S}INR'^*_k = \max_n \tilde{S}INR'_{n,k} = \frac{|\hat{h}_k\phi_{n*}|^2}{1 + \sum_{i=1,i\neq n*}^{N}|\hat{h}_k\phi_i|^2 + \text{Intercell Interference}},$$

and the optimistic fine quantization CQI (CQI$_4$) is represented by $$\tilde{S}INR'^*_k = \max_n \tilde{S}INR'_{n,k} = \frac{|\hat{h}_k\phi'_{n*}|^2}{1 + \text{Intercell Interference}},$$

where $|\hat{h}_k\phi_{n*}|^2$ represents a received signal power for course quantization, $|\hat{h}_k\phi'_{n*}|^2$ represents a received signal power for fine quantization, $\Sigma_{i=1,i\neq n*}^{N}|\hat{h}_k\phi_i|^2$ represents the intra-cell interference component power, $\hat{h}_k$ is an estimated channel of the received data transmission for the UE k, N is a number of UEs served by the eNB and n=1, 2, ..., N, $\phi_{n*}$ is a precoding matrix indicator (PMI) that maximizes $\tilde{S}$ INRn,k, $\phi'_{n*}$ is a precoding matrix indicator (PMI) that maximizes $\tilde{S}$ INR'n,k and $\phi_i$ is an interference from other beams.

Figure 13:
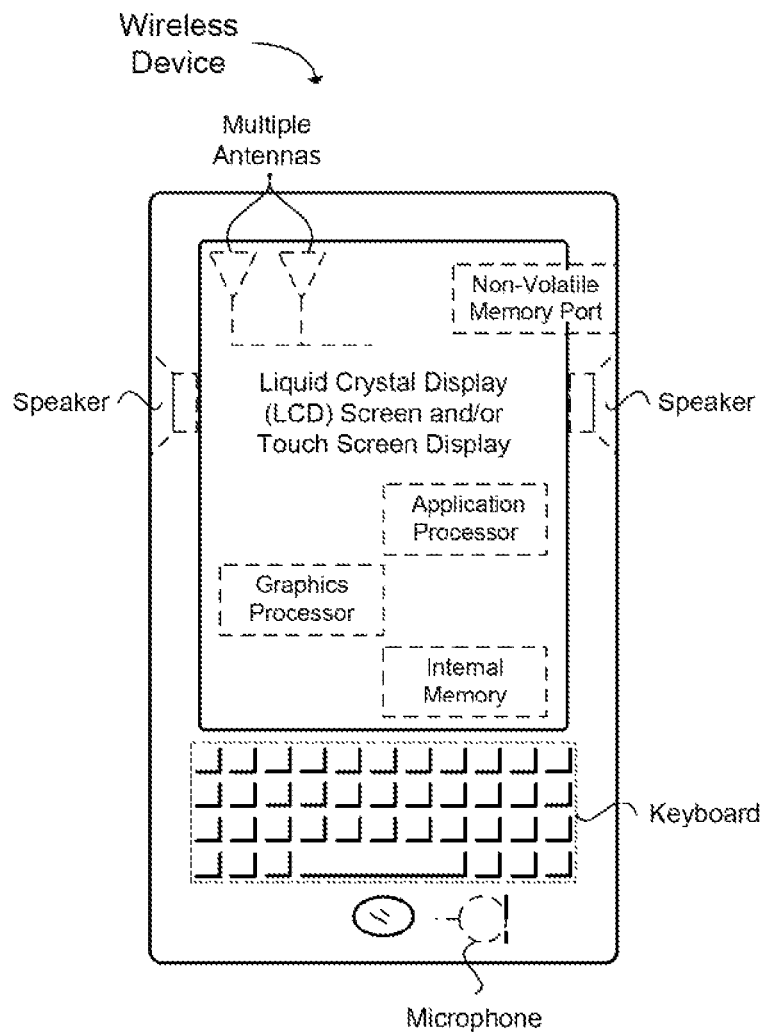
FIG. 13 illustrates a diagram of a wireless device (e.g., UE) in accordance with an example.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 13 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed a module of executable code may be a single instruction, or many instructions, and may even be distributed over several different code segments, among different programs and across several memory devices. Similarly, operational data may be identified and illustrated herein within modules, and may be embodied in any suitable form and organized within any suitable type of data structure. The operational data may be collected as a single data set, or may be distributed over different locations including over different storage devices and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to provide hybrid beamforming feedback, having computer circuitry configured to:

receive a reference signal (RS) from a node;

calculate an optimal channel direction from the RS;

calculate an optimal signal-to-interference-plus-noise ratio (SINR) for the optimal channel direction, wherein the optimal SINR is conditionally calculated with an intra-cell interference component or calculated without the intra-cell interference component based on a feedback configuration; and transmit the optimal channel direction and the optimal SINR to the node.

2. The computer circuitry of claim 1, wherein: the optimal SINR calculated with the intra-cell interference component is represented by $$\overline{SINR}_k^* = \max_n \overline{SINR}_{n,k} = \frac{|\hat{h}_k \phi_{n^*}|^2}{1 + \sum_{i=1, i \neq n^*}^{N} |\hat{h}_k \phi_i|^2 + \text{Intercell Interference}}$$

and converted into a channel quality indicator (CQI) accounting for intra-cell interference ($CQI_1$), and the optimal SINR calculated with the intra-cell interference component is transmitted in the $CQI_1$, where $|\hat{h}_k \phi_{n^*}|^2$ represents a received signal power, $\Sigma_{i=1, i \neq n^*}^{N} |\hat{h}_k \phi_i|^2$ represents the intra-cell interference component power, $\hat{h}_k$ is an estimated channel of the received RS for the UE k, N is a number of UEs served by the node and n=1, 2, ..., N, $\phi_{n^*}$ is a precoding matrix indicator (PMI) that maximizes $\widehat{SINR}_{n,k}$, and $\phi_i$ is the interference from other beams; and the optimal SINR calculated without the intra-cell interference component is represented by $$\widehat{SINR}_k^* = \max_n \widehat{SINR}_{n,k} = \frac{|\hat{h}_k \phi_{n^*}|^2}{1 + \text{Intercell Interference}}$$

and converted into a CQI without accounting for intra-cell interference ($CQI_2$), and the optimal SINR calculated without the intra-cell interference component is transmitted in the $CQI_2$.

3. The computer circuitry of claim 1, wherein the optimal SINR calculated with the intra-cell interference component is calculated assuming a simple random beamforming (RBF) linear precoding mechanism, and the optimal SINR calculated without the intra-cell interference component is calculated assuming a zero-forcing beamforming (ZFBF) linear precoding mechanism.

4. The computer circuitry of claim 1, wherein computer circuitry configured to transmit the optimal SINR is further configured to transmit both the optimal SINR calculated with the intra-cell interference component and the optimal SINR calculated without the intra-cell interference component.

5. The computer circuitry of claim 1, wherein computer circuitry configured to transmit the optimal channel direction and the optimal SINR is further configured to:
   transmit a course quantization optimal channel direction and a course quantization optimal SINR calculated with the intra-cell interference component;
   receive a request from the node to use fine quantization; and
   transmit a fine quantization optimal channel direction and a fine quantization optimal SINR calculated without the intra-cell interference component.

6. The computer circuitry of claim 1, wherein computer circuitry configured to transmit the optimal channel direction and the optimal SINR is further configured to:
   transmit a course quantization optimal channel direction, a pessimistic course quantization optimal SINR calculated with the intra-cell interference component, and an optimistic course quantization optimal SINR calculated without the intra-cell interference component;
   receive a request from the node to use fine quantization; and
   transmit a fine quantization optimal channel direction, a pessimistic fine quantization optimal SINR calculated with the intra-cell interference component, and an optimistic fine quantization optimal SINR calculated without an intra-cell interference component.

7. A method for receiving random beamforming (RBF) feedback and zero-forcing beamforming (ZFBF) feedback at a node, comprising:

receiving an optimal channel direction from a user equipment (UE);
receiving an optimal signal-to-interference-plus-noise ratio (SINR) for the optimal channel direction, wherein the node is configured to conditionally receive the optimal SINR calculated with an intra-cell interference component or receive the optimal SINR calculated without an intra-cell interference component based on a feedback configuration; and
linear precoding transmissions using RBF precoding or ZFBF precoding based on the optimal SINR.

8. The method of claim 7, further comprising:
transmitting a reference signal (RS) to the UE, wherein the optimal channel direction and the optimal SINR is determined from the RS.

9. The method of claim 7, further comprising:
selecting a RBF UE for a RBF group based on a criteria, wherein the criteria improves a channel condition, maximizes overall throughput, maximizes per user throughput, or minimizes delay; and
selecting a ZFBF UE for a ZFBF group based on the criteria;
wherein linear precoding transmissions further comprises:
linear precoding transmissions of the RBF UE in the RBF group using the RBF precoding; and
linear precoding transmissions of the ZFBF UE in the ZFBF group using the ZFBF precoding.

10. The method of claim 7, wherein receiving the optimal SINR for the optimal channel direction further comprises:
receiving both a pessimistic channel quality indicator (CQI) representing the optimal SINR calculated with the intra-cell interference component and an optimistic CQI representing the optimal SINR calculated without the intra-cell interference component.

11. The method of claim 7, wherein receiving the optimal SINR for the optimal channel direction further comprises:
receiving a course quantization precoding matrix indicator (PMI) representing a course quantization optimal channel direction and receiving a course quantization channel quality indicator (CQI) representing a course quantization optimal SINR calculated with the intra-cell interference component, wherein the course quantization PMI and the course quantization CQI are generated from a low density codebook;
evaluating the course quantization optimal SINR against an environmental condition or a system criteria;
transmitting a request to the UE to use fine quantization based on the course quantization optimal SINR; and
receiving a fine quantization PMI representing a fine quantization optimal channel direction and receiving a fine quantization CQI representing a fine quantization optimal SINR calculated without the intra-cell interference component, wherein the fine quantization PMI and the fine quantization CQI are generated from a high density codebook.

12. The method of claim 11, wherein linear precoding transmissions further comprises:
transmitting data using the RBF precoding for a RBF UE when a specified environmental condition threshold and a specified system criteria is not met; and
transmitting data using the ZFBF precoding for a ZFBF UE when the specified environmental condition threshold or the specified system criteria is met.

13. The method of claim 7, wherein receiving the optimal SINR for the optimal channel direction further comprises:
receiving a course quantization precoding matrix indicator (PMI) representing a course quantization optimal channel direction, receiving a pessimistic course quantization channel quality indicator (CQI) representing a pessimistic course quantization optimal SINR calculated with the intra-cell interference component, and receiving an optimistic course quantization CQI representing an optimistic course quantization optimal SINR calculated without the intra-cell interference component, wherein the course quantization PMI, the pessimistic course quantization optimal SINR, and the optimistic course quantization CQI are generated from a low density codebook;

evaluating the course quantization optimal SINR against an environmental condition or a system criteria;

transmitting a request to the UE to use fine quantization based on the course quantization optimal SINR; and receiving a fine quantization precoding matrix indicator (PMI) representing a fine quantization optimal channel direction, receiving a pessimistic fine quantization CQI representing a pessimistic fine quantization optimal SINR calculated with the intra-cell interference component, and receiving an optimistic fine quantization CQI representing an optimistic fine quantization optimal SINR calculated without the intra-cell interference component, wherein the fine quantization PMI, the pessimistic fine quantization optimal SINR, and the optimistic fine quantization CQI are generated from a high density codebook.

14. The method of claim 13, wherein linear precoding transmissions further comprises:

transmitting data using the RBF precoding based on a pessimistic optimal SINR when a specified environmental condition threshold and a specified system criteria is not met; and transmitting data using the ZFBF precoding based on an optimistic optimal SINR when the specified environmental condition threshold or the specified system criteria is met.

15. The method of claim 7, wherein:

the optimal SINR calculated with the intra-cell interference component is represented $$\widetilde{SINR}_k^* = \max_n \widetilde{SINR}_{n,k} = \frac{|\hat{h}_k \phi_{n^*}|^2}{1 + \sum_{i=1, i \neq n^*}^{N} |\hat{h}_k \phi_i|^2 + \text{Intercell Interference}}$$

by and converted into a channel quality indicator (CQI) accounting for intra-cell interference ($CQI_1$), and the optimal SINR calculated with the intra-cell interference component is transmitted in the $CQI_1$, where $|\hat{h}_k \phi_{n^*}|^2$ represents a received signal power, $\Sigma_{i=1, i \neq n^*}^{N} |\hat{h}_k \phi_i|^2$ represents the intra-cell interference component power, $\hat{h}_k$ is an estimated channel of the received RS for the UE k, N is a number of UEs served by the node and n=1, 2, ..., N, $\phi_{n^*}$ is a precoding matrix indicator (PMI) that maximizes $\widetilde{SINR}_{n,k}$, and $\phi_i$ is an interference from other beams; and the optimal SINR calculated without the intra-cell interference component is represented by $$\widetilde{SINR}_k^* = \max_n \widetilde{SINR}_{n,k} = \frac{|\hat{h}_k \phi_{n^*}|^2}{1 + \text{Intercell Interference}}$$

and converted into a CQI without accounting for intra-cell interference ($CQI_2$), and the optimal SINR calculated without the intra-cell interference component is transmitted in the $CQI_2$.

16. The method of claim 7, wherein the node includes M transmit antennas, where M>8 and the node is selected from the group consisting of a base station (BS), a Node B (NB), an evolved Node B (eNB), a baseband unit (BBU), a remote radio head (RRH), a remote radio equipment (RRE), a remote radio unit (RRU), and a central processing module (CPM).

17. At least one non-transitory machine readable storage medium comprising a plurality of instructions adapted to be executed to implement the method of claim 7.

18. A user equipment (UE) configured for hybrid beamforming feedback, comprising:

a transceiver to receive a data transmission from an evolved Node B (eNB); and a processor to:

calculate an optimal channel direction from the data transmission;

generate a precoding matrix indicator (PMI) based on the optimal channel direction;

calculate an optimal signal-to-interference-plus-noise ratio (SINR) for the optimal channel direction, wherein the optimal SINR is conditionally calculated with an intra-cell interference component or calculated without the intra-cell interference component based on a feedback configuration;

generate a pessimistic channel quality indicator (CQI) when the optimal SINR is calculated with the intra-cell interference component; and generate an optimistic CQI when the optimal SINR is calculated without the intra-cell interference component; and wherein the transceiver is further configured to:

transmit the PMI and the pessimistic CQI to the eNB; or transmit the PMI and the optimistic CQI to the eNB.

19. The UE of claim 18, wherein the PMI is represented by $\phi_{n^*}$, the pessimistic CQI ($CQI_1$) is represented by $$\widetilde{SINR}_k^* = \max_n \widetilde{SINR}_{n,k} = \frac{|\hat{h}_k \phi_{n^*}|^2}{1 + \sum_{i=1, i \neq n^*}^{N} |\hat{h}_k \phi_i|^2 + \text{Intercell Interference}},$$

and the optimistic CQI ($CQI_2$) is represented by $$\widetilde{SINR}_k^* = \max_n \widetilde{SINR}_{n,k} = \frac{|\hat{h}_k \phi_{n^*}|^2}{1 + \text{Intercell Interference}},$$

where $|\hat{h}_k \phi_{n^*}|^2$ represents a received signal power, $\Sigma_{i=1, i \neq n^*}^{N} |\hat{h}_k \phi_i|^2$ represents the intra-cell interference component power, $\hat{h}_k$ is an estimated channel of the received data transmission for the UE k, N is a number of UEs served by the eNB and n=1, 2, ..., N, $\phi_{n^*}$ is a precoding matrix indicator (PMI) that maximizes $\widetilde{SINR}_{n,k}$, and $\phi_i$ is an interference from other beams.

20. The UE of claim 18, wherein the transceiver is further configured to transmit both the pessimistic CQI and the optimistic CQI, where the PMI is represented by $\phi_{n^*}$, the pessimistic CQI ($CQI_1$) is represented by $$\widetilde{SINR}_k^* = \max_n \widetilde{SINR}_{n,k} = \frac{|\hat{h}_k \phi_{n^*}|^2}{1 + \sum_{i=1, i \neq n^*}^{N} |\hat{h}_k \phi_i|^2 + \text{Intercell Interference}},$$

and the optimistic CQI (CQI$_2$) is represented by $$\widetilde{SINR}_k^* = \max_n \widetilde{SINR}_{n,k} = \frac{|\hat{h}_k \phi_{n^*}|^2}{1 + \text{Intercell Interference}},$$

where $|\hat{h}_k \phi_{n^*}|^2$ represents a received signal power, $\sum_{i=1, i \neq n^*}^{N} |\hat{h}_k \phi_i|^2$ represents the intra-cell interference component power, $\hat{h}_k$ is an estimated channel of the received data transmission for the UE k, N is a number of UEs served by the eNB and n=1, 2, ..., N, $\phi_{n^*}$ is a precoding matrix indicator (PMI) that maximizes $\widetilde{SINR}_{n,k}$, and $\phi_i$ is an interference from other beams.

21. The UE of claim 18, wherein the processor is further configured to:
generate a course quantization PMI and a course quantization CQI based on a low density codebook; and
generate a fine quantization PMI and a fine quantization CQI based on a high density codebook,
where the course quantization PMI (PMI$_1$) is represented by $\phi_{n^*}$, the course quantization CQI (CQI$_1$) uses the pessimistic CQI and is represented by $$\widetilde{SINR}_k^* = \max_n \widetilde{SINR}_{n,k} = \frac{|\hat{h}_k \phi_{n^*}|^2}{1 + \sum_{i=1, i \neq n^*}^{N} |\hat{h}_k \phi_i|^2 + \text{Intercell Interference}},$$

the fine quantization PMI (PMI$_2$) is represented by $\phi'_{n^*}$, and the fine quantization CQI (CQI$_2$) uses the optimistic CQI and is represented by $$\widetilde{SINR}_k^* = \max_n \widetilde{SINR}_{n,k} = \frac{|\hat{h}_k \phi'_{n^*}|^2}{1 + \text{Intercell Interference}},$$

where $|\hat{h}_k \phi_{n^*}|^2$ represents a received signal power for course quantization, $|\hat{h}_k \phi'_{n^*}|^2$ represents a received signal power for fine quantization, $\sum_{i=1, i \neq n^*}^{N} |\hat{h}_k \phi_i|^2$ represents the intra-cell interference component power, $\hat{h}_k$ is an estimated channel of the received data transmission for the UE k, N is a number of UEs served by the eNB and n=1, 2, ..., N, $\phi_{n^*}$ is a precoding matrix indicator (PMI) that maximizes $\widetilde{SINR}_{n,k}$, $\phi'_{n^*}$ is a precoding matrix indicator (PMI) that maximizes SINR'n,k and $\phi_i$ is an interference from other beams.

22. The UE of claim 18, wherein the processor is further configured to:
generate a course quantization PMI, a pessimistic course quantization CQI, and an optimistic course quantization CQI based on a low density codebook; and
generate a fine quantization PMI, a pessimistic fine quantization CQI, and an optimistic fine quantization CQI based on a high density codebook,
where the course quantization PMI (PMI$_1$) is represented by $\phi_{n^*}$, the pessimistic course quantization CQI (CQI$_1$) is represented by $$\widetilde{SINR}_k^* = \max_n \widetilde{SINR}_{n,k} = \frac{|\hat{h}_k \phi_{n^*}|^2}{1 + \sum_{i=1, i \neq n^*}^{N} |\hat{h}_k \phi_i|^2 + \text{Intercell Interference}},$$

the optimistic course quantization CQI (CQI$_2$) is represented by $$\widetilde{SINR}_k^* = \max_n \widetilde{SINR}_{n,k} = \frac{|\hat{h}_k \phi'_{n^*}|^2}{1 + \text{Intercell Interference}},$$

the fine quantization PMI (PMI$_2$) is represented by $\phi'_{n^*}$, the pessimistic fine quantization CQI (CQI$_3$) is represented by $$\widetilde{SINR}_k^* = \max_n \widetilde{SINR}_{n,k} = \frac{|\hat{h}_k \phi'_{n^*}|^2}{1 + \sum_{i=1, i \neq n^*}^{N} |\hat{h}_k \phi_i|^2 + \text{Intercell Interference}},$$

and the optimistic fine quantization CQI (CQI$_4$) is represented by $$\widetilde{SINR}_k^* = \max_n \widetilde{SINR}_{n,k} = \frac{|\hat{h}_k \phi'_{n^*}|^2}{1 + \text{Intercell Interference}},$$

where $|\hat{h}_k \phi_{n^*}|^2$ represents a received signal power for course quantization, $|\hat{h}_k \phi'_{n^*}|^2$ represents a received signal power for fine quantization, $\sum_{i=1, i \neq n^*}^{N} |\hat{h}_k \phi_i|^2$ represents the intra-cell interference component power, $\hat{h}_k$ is an estimated channel of the received data transmission for the UE k, N is a number of UEs served by the eNB and n=1, 2, ..., N, $\phi_{n^*}$ is a precoding matrix indicator (PMI) that maximizes SINRn,k, $\phi'_{n^*}$ is a precoding matrix indicator (PMI) that maximizes SINR'n,k and $\phi_i$ is an interference from other beams.

23. The UE of claim 18, wherein the UE includes an antenna, a touch sensitive display screen, a speaker, a microphone, a graphics processor, an application processor, internal memory, or a non-volatile memory port.

* * * * *